United States Patent [19]

Page

[11] 4,016,547
[45] Apr. 5, 1977

[54] MOS SHIFT REGISTER COMPENSATION SYSTEM FOR DEFECTIVE TRACKS OF DRUM STORAGE SYSTEM

[75] Inventor: Robert E. Page, San Diego, Calif.

[73] Assignee: The United States of America as represented by the Secretary of the Navy, Washington, D.C.

[22] Filed: Jan. 22, 1976

[21] Appl. No.: 651,660

[52] U.S. Cl. .............................. 340/172.5; 360/47; 360/54; 360/63

[51] Int. Cl.$^2$ ................. G06F 11/00; G06F 13/04; G11B 5/09

[58] Field of Search ............ 340/172.5; 360/47, 54, 360/63; 235/153 AM

[56] References Cited

UNITED STATES PATENTS

| | | | |
|---|---|---|---|
| 3,147,462 | 9/1964 | Levinson | 360/63 |
| 3,387,281 | 6/1968 | Peters | 340/172.5 |
| 3,689,891 | 9/1972 | Kril | 340/172.5 |

*Primary Examiner*—James D. Thomas
*Attorney, Agent, or Firm*—Richard S. Sciascia; Ervin F. Johnston; Thomas Glenn Keough

[57] ABSTRACT

Loss of a magnetic track on a rotating drum memory is compensated for by a serially connected shift register. Since replacement of an entire magnetic drum is a costly venture, it usually is not warranted when only one or two or several tracks have become corroded or otherwise scored. The shift register is provided with an appropriate amount of stages to handle the data otherwise stored on a damaged magnetic drum track. Provision is made in the inventive concept herein disclosed for providing index and clock signals in event of the failure of the index and clocking tracks in the memory drum.

7 Claims, 1 Drawing Figure

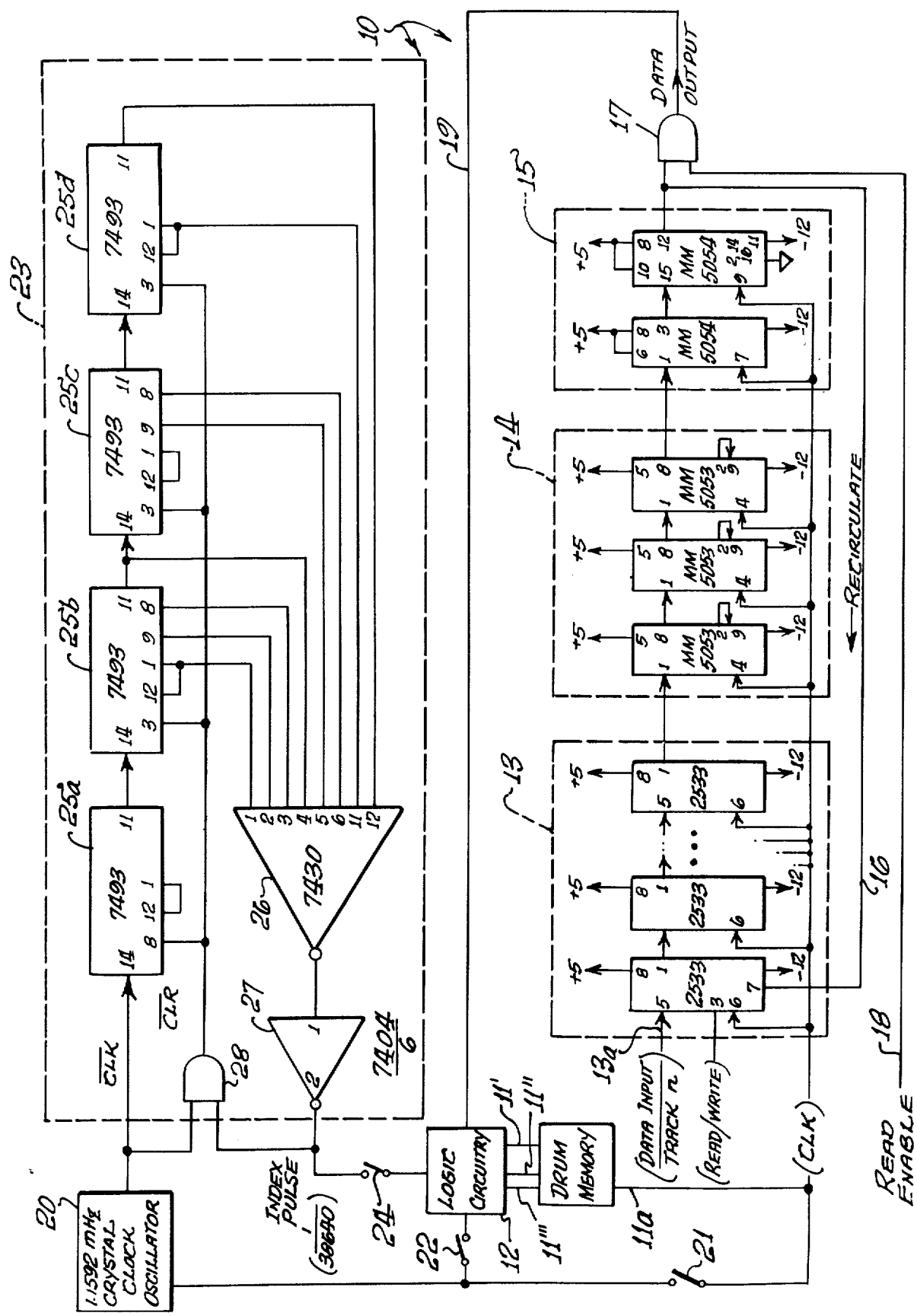

MOS SHIFT REGISTER COMPENSATION SYSTEM FOR DEFECTIVE TRACKS OF DRUM STORAGE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

One well known and widely used means of storing digital data is to record the data on a rotating magnetic drum memory. Magnetic heads are disposed near recording tracks on the drum to polarize its surface and thereby indicate bits of information. Unfortunately, the recording surfaces become burned or scored by the magnetic recording heads or by some other mechanical failure. For instance, were the axis of the drum to get off center by failure of a bearing or driving machinery, the magnetic writing and reading heads could be brought to bear against the magnetic tracks. Another way the tracks could be damaged occurs when a magnetic head is loosened by the rotational vibrations of the drum and it comes in contact with a magnetic track. Heretofore, loss of one or several tracks on a drum had to be tolerated by data processors with a consequent reduction in the system's capability. Return to a full capability called for replacing the entire magnetic rotating drum memory. This course of action largely has proven to be unwise since the cost of replacing an entire rotating drum generally would not be offset by the recapture of the data storage capability of one or two damaged tracks. Therefore, there is a continuing need in the state of the art for an electronics package which compensates for the loss of a track in a rotating magnetic drum memory and which stores and recirculates the data until it is read out by interconnected logic circuitry.

SUMMARY OF THE INVENTION

The present invention is directed to providing an apparatus for compensating for the loss of a data storage capability on a rotating drum memory. A means for providing the memory on the drum has at least one track nonresponsive to reading and writing data, a clock track to shift data or an index track to indicate initiation of a cycle. Logically processing means are coupled to all the tracks on the rotating drum memory and a receiving means is coupled to the logically processing means for storing the reading and writing data of the nonresponsive track of the drum memory. Additionally, means for providing an index signal in the event of failure of the index track ensures that the lost data storage track on the rotating drum memory does not compromise the memory's effectiveness.

It is an object of the invention to provide an improved data storage compensator.

Yet another object of the invention is to provide for a solid state data storage compensator which is compatible with a magnetic rotating drum memory.

Still another object of the invention is to provide circuitry capable of initiating index signals, clock signals and data signals as needed.

A further object of the invention is to provide a three stage shift register capable of accommodating data otherwise lost from a damaged track of a rotating drum memory.

Yet another object is to provide a metallic oxide shift register compatible with a transistor transistor logic index pulsing circuit electronically cooperating to compensate for a damaged data track on a rotating drum memory.

These and other objects of the invention will become more readily apparent from the ensuing description when taken with the drawings.

BRIEF DESCRIPTION OF THE DRAWINGS

A schematic representation of the salient features of the invention is portrayed in the drawing.

DESCRIPTION OF THE PREFERRED EMBODIMENT

Referring now to the drawing, there is shown a representative embodiment of a solid state memory 10 which embraces the inventive concept for compensating for the loss of a track on a rotating drum memory 11. Rotating memories are usually magnetically influenced to record digital bits of information and are in widespread use. Their capability for storing vast quantities of data and ability for nearly real-time reading and writing have led to wide acceptance of this memory. However, like all mechanical devices failure of components reduces their intended effectiveness, scoring or otherwise abrading the recording tracks makes them incapable of handling data. One typical way a track becomes nonresponsive to data is when one of the recording heads becomes loose and rubs along the rotating drum. Intense magnetic fields or shorts are other reasons why the recording tracks on a magnetic rotating drum fail. Because of the present invention, failure of one or a few of the recording tracks on a rotating magnetic drum need not reduce the effectiveness of the entire unit.

A typical rotating drum memory is manufactured by the Bryant of Hawthorn, California as Model 1851024. For its forty thousand dollar cost, each unit provides five hundred seventy six tracks. It stores data for interconnected logic circuitry 12 for a variety of conventional data processing functions.

Solid state memory circuit 10 of the instant invention ensures that the full capability of this particular rotating drum memory is retained although modifications to this circuit within the scope of one skilled in the art can be made to accommodate other drum memories. Three cascaded shift registers 13, 14, and 15 are interconnected to receive thirty eight thousand, six hundred forty bits of digital information. First stage 13 is made up of thirty seven, one thousand twenty four bit static shift registers commercially available under the trade designation 2533 and marketed, among others, by the Signetics Corporation in Menlo Park, California.

When the track in the drum memory which provides clock pulses is not impaired, drum memory 11 feeds clock signals to the cascaded shift registers via lead 11a. Data coming in on lead 13a is successively gated through the first shift register. Once thirty seven, three hundred eighty eight bits of data have been accumulated in the first shift register they are fed to second shift register 14.

This shift register is formed of three integrated circuits commercially marketed by the National Semiconductor Corporation of Santa Clara, California under the trade designation MM 5053. They store and shift six hundred bits and when their capacity has been exceeded, shift register 15 accounts for the remaining one hundred fifty two bits of the thirty eight thousand, six hundred forty bits of information otherwise intended to be stored on the damaged track of the drum memory.

The last shift register 15 is made up of a pair of National Semiconductor Corporation integrate circuits marketed under the designation MM 5054. Each of the circuits has a capability for storing or circulating either sixty or seventy-two or eighty bits of data. The two '5054 circuits have been interconnected as shown in the drawing to provide for a seventy-two bit and an eighty bit storage-shift capability. Thus, among the three shift registers the thirty eight thousand, six hundred forty bits normally stored on the damaged track is stored in the three cascaded shift registers 13, 14, and 15.

Provision for recirculating and thereby indefinitely storing the data in the shift registers is ensured by a lead 16 reaching from pin 12 of the last '5054 circuit to pin 7 of the first '2533 register. By this expedient the storage capability of the lost track on a rotating drum memory becomes an inherent feature of the disclosed electronically cooperating cascaded shift register.

Transfer of the digital information from the shift register to logic circuitry 12 is enabled when an "and" gate 17 receives a readenable signal via lead 18. The data is fed to the logic circuitry on a conductor 19 and appropriate data processing follows.

Should the drum memory track generating the clock pulses which are normally fed to the shift registers via lead 11a become damaged, a crystal clock oscillator 20 is included to compensate for the loss of this function. Drum memory 11 provides data signals schematically depicted as passing on a lead 11' and clocking signals are fed via a lead 11". The clocking signals must logically coincide with the data signals for effective processing and indexing signals on lead 11''' indicate the beginning of a logic cycle.

An electronic switch 21 is actuated to feed the clock pulses from oscillator 20 to the cascaded shift registers. The clock pulses also reach logic circuitry 12 when an appropriately interconnected electronic switch 22 electronically couples the oscillator to the logic circuitry. Thus, it is obvious that the present invention not only compensates for a lost data storage capability of one of the tracks of the drum memory but also can ensure continued system operation when the clock signal track is damaged in the drum.

Further, highly reliable and continued operation of the logic circuitry is provided for by an index generating means, an index simulator circuit 23. An index signal is coupled to logic circuitry by an electronic switch 24 to enable initiation of the beginning or ending or whatever preprogrammed logic sequence is needed.

The index simulator circuit is triggered by crystal clock oscillator 20 and four interconnected up-down binary counters 25a, 25b, 25c, 25d connected as shown to deliver pulses to an eight-input "and" gate 26. The up-down binary counters are transistor transistor logic components, examples of which are commercially available by from the National Semiconductor Corporation of Santa Clara, California, and are marketed under the trade designation SM7493. The eight-input "and" gate is a National SN 7430 eight-input gate. Following the "and" gate a National 7406 inverter 27 passes the proper polarity signal to a clearing "and" gate 28 as well as to the electronic switch 24.

Obviously, many modifications and variations of the present invention are possible in the light of the above teachings, and, it is therefore understood that the invention may be practiced otherwise than as specifically described.

What is claimed is:

1. An apparatus for compensating for the loss of a damaged data storage track on a rotating drum memory comprising:
   means for logically processing data electronically coupled to all tracks on the rotating drum memory and
   means for providing a memory for the data otherwise stored on a damaged track of the drum, such data being representative of reading and writing data, clock shift data and an index data to indicate initiation of a cycle the providing means including;
   means coupled to the logically processing means for receiving storing and recycling the reading and writing data otherwise to be stored on a damaged reading and writing data track on the rotating drum memory,
   means for clocking the data on the receiving means to shift and recycle it through the receiving means, the clocking means is coupled to feed clock pulses to the receiving means and the logically processing means when the clock track is damaged on the rotating drum memory, and
   means coupled to the clocking means and the logically processing means for generating an indexing signal and feeding the indexing signal to the logically processing means when an index track is damaged on the rotating drum memory.

2. An apparatus according to claim 1 further including:
   means for recirculating data in the receiving means.

3. An apparatus according to claim 1 in which the receiving means is three-cascaded shift register units to store and recirculate thirty eight thousand six hundred forty bits of data.

4. An apparatus according to claim 3 in which the recirculating means is a conductor extending from the last shift register of the three cascaded shift register units to the first shift register of the three cascaded shift register units.

5. An apparatus according to claim 4 in which the generating means is four cascaded updown binary counters coupled to an eight input NAND gate and inverter to provide the indexing signal.

6. An apparatus according to claim 5 in which the clocking means is a crystal oscillator.

7. An apparatus according to claim 6 in which the generating means is fabricated to generate the indexing signal one time each time the cascaded shift register units store and recirculated thirty eight thousand six hundred forty bits of data.

* * * * *